United States Patent [19]

Lerman

[11] Patent Number: 5,625,354
[45] Date of Patent: Apr. 29, 1997

[54] COMPACT STYLUS KEYBOARD

[76] Inventor: Samuel I. Lerman, 22450 Twyckingham, Southfield, Mich. 48034

[21] Appl. No.: 592,593

[22] Filed: Jan. 26, 1996

[51] Int. Cl.$^6$ .......................... H03K 17/94; H03M 11/00
[52] U.S. Cl. .............................. 341/20; 341/22; 345/179; 364/709.12
[58] Field of Search .......................... 341/20, 22, 23; 345/179; 364/709.12

[56] References Cited

U.S. PATENT DOCUMENTS

| | | | |
|---|---|---|---|
| 5,251,163 | 10/1993 | Rouhani | 364/709.12 |
| 5,334,976 | 8/1994 | Wang | 341/22 |
| 5,451,724 | 9/1995 | Nakazawa et al. | 345/179 |
| 5,457,454 | 10/1995 | Sugano | 345/179 |
| 5,483,235 | 1/1996 | Hanson et al. | 341/22 |

*Primary Examiner*—Jeffery Hofsass
*Assistant Examiner*—Timothy Edwards, Jr.
*Attorney, Agent, or Firm*—Terrance L. Siemens

[57] ABSTRACT

A compact stylus keyboard assembly includes a generally planar upper surface formed by a plurality of adjacently positioned, co-planar, electrically conductive key members which together form a keyboard. A hand-held stylus member is used to lightly touch and couple a predetermined voltage to each of individual key members of the keyboard. The key members are individually responsive to the predetermined voltage and provide a computer with a signal when coupled to the voltage. Each of the key members are hexagonal shaped and electrically isolated by an electrical insulating material in the form of a honeycomb pattern. The stylus member is generally T-shaped in cross section with a first, contact end and a second, opposite, end for facilitating single handed gripping and operation. The stylus member includes depressible switches that are operated by the operator's digits for providing modifying functions such as shift, control, and alternate while the stylus member is touching the key members. The stylus member enables an operator to grip the stylus member with a single hand such that the key members may be touched one by one, or the operator may manually slide the stylus member upon the planar upper surface of the keyboard across desired key members and the electrical insulating material therebetween in order to provide the computer with a sequence of key signals.

18 Claims, 2 Drawing Sheets

COMPACT STYLUS KEYBOARD

BACKGROUND OF INVENTION

This invention relates to a compact stylus keyboard for use in conjunction with a computer and, particularly, a compact stylus keyboard designed for single handed operation that reduces the complexity of hand and finger movements and the amount of physical effort associated with inputting keyboard data into a computer.

Conventional keyboards have a plurality of key members representing different letters, numbers, or symbols that are typically arranged in numerous rows and columns such that an operator is required to use two hands to rapidly and efficiently operate the keyboard. Such conventional keyboards require extensive training and practice to coordinate the use of all fingers of both hands, comparable to the training of a skilled pianist. Untrained operators usually use a "hunt and peck" technique. Additionally, both sides of a user's brain are utilized, with such concentration on the mechanical process that creative thinking is in abeyance. The size of conventional keyboards is dictated by finger-size, and so-called palm-sized computers permit only slower typing with one or two fingers. Most computer keyboards are not used for word processing but rather are used for data retrieval or brief entries, such as at an airline ticket counter, which is often performed by persons who do not use skilled typing techniques. The individual key members of a conventional keyboard are typically depressed in response to a certain amount of pressure applied by an operator's fingers such that standardized and well known electronics associated with the keyboard provide an attached computer with respective key signals that enable the computer to recognize each of the key members.

The present invention relates to an improved keyboard design that employs a hand-held stylus member that reduces the physical size requirements of the keyboard, reduces the complexity of the operator's hand and finger movements, and reduces the amount of physical effort needed to rapidly and efficiently input data into a computer as compared with the above-described finger operated keyboards.

SUMMARY OF INVENTION

This invention relates to a compact stylus keyboard assembly operable with a single hand for use in conjunction with an accompanying computer. The compact stylus keyboard assembly reduces the complexity of an operator's required hand and finger movements and reduces the physical effort needed for its operation.

The compact stylus keyboard assembly has a generally planar upper surface formed by a plurality of adjacently positioned, co-planar electrically conductive key members which together form a keyboard. Each of the key members provide the computer with a signal when coupled to a predetermined voltage. Electrical insulating material is disposed between each of the key members for providing electrical isolation between a key member which is coupled to the predetermined voltage and the remaining key members of the keyboard.

A hand-held stylus member for coupling the predetermined voltage to the individual key members includes a first, key contact, end and a second, remote, end. The stylus member can be generally T-shaped in cross section to facilitate single handed gripping and operation. An electrically conductive tip forms the first or contact end of the hand-held stylus member and is coupled to the predetermined voltage. The electrically conductive tip is configured for individually contacting and coupling the predetermined voltage to any of the electrically conductive key members.

The foregoing compact stylus keyboard assembly arrangement provides for the inputting of standard keyboard data into the computer by an operator gripping the stylus member with a single hand and contacting the key members, one by one, with the electrically conductive tip. The operator may manually slide the electrically conductive tip from one key member, upon the planar upper surface of the keyboard, across the electrical insulating material, to another adjacent key member or may manually lift the stylus member from one key member and place the electrically conductive tip in contact with another non-adjacent key member in order to provide the computer with a sequence of key signals. The use of the hand-held slidable or liftable stylus member in conjunction with the keyboard reduces the complexity of hand and finger movements as well as the physical effort required for inputting keyboard data into the computer.

In accordance with a preferred embodiment, the hand-held stylus member has a generally T-shaped cross section with a head portion and a stem portion that extends outward from the head portion. The stylus member has at least one depressible switch located in close proximity to its contact end. The switch is depressed by a finger or thumb to provide the computer with a modifying function signal.

In accordance with another preferred embodiment, each of the electrically conductive key members is hexagonally shaped, and the key members are grouped in a honeycomb pattern in order to minimize the distances between each of the key members and, thereby, minimize the distance that the hand-held stylus member must move in order to contact the other key members. The key members representing the most frequently used indicia such as letters, numbers, or symbols are positioned in close proximity to a center location of the generally planar surface of the keyboard, with the next most frequently occurring indicia positioned further away from the center location than the most frequently occurring indicia.

An overall object of this invention is to provide a simplified compact, stylus operated, keyboard assembly which is compact in size, allows for one handed operation without requiring complex hand and finger movements, and reduces the amount of physical effort and time needed for its operation.

A further object is to provide a simplified, relatively inexpensive, small size, computer keyboard which is operated by rapidly contacting the keys with a hand-held stylus and which is particularly useful to an unskilled typist.

These and other objects and advantages of this invention will become apparent upon reading the following description, of which the attached drawings form a part.

DETAILED DESCRIPTION

Figure 1:
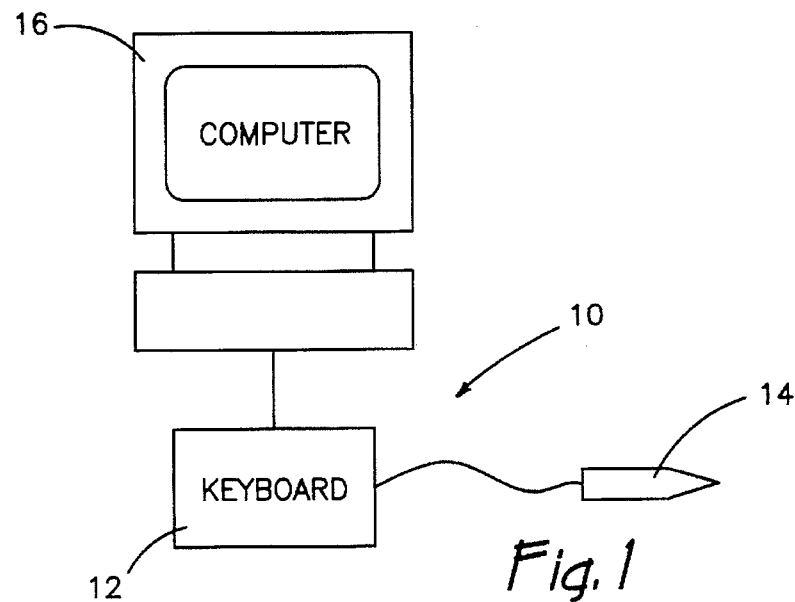
FIG. 1 schematically illustrates, a stylus, keyboard, and computer assembly for inputting keyboard data into the computer.

FIG. 1 illustrates a compact stylus keyboard assembly 10 which includes a compact keyboard 12 coupled to an elongated, hand-held stylus member 14. The compact stylus keyboard assembly 10 is coupled to a conventional computer 16 for rapidly inputting standard keyboard data into the computer 16 with minimal hand and finger movements. The keyboard 12 may be coupled to the computer 16 through a hard wired connection or a wireless transceiver assembly. The invention herein relates to the construction of the keyboard 12 and the hand-held stylus member 14 which, may be used in conjunction with otherwise standard keyboard electronics and computers.

Computer keyboards typically include a plurality of finger operated key members that are individually responsive to predetermined forces exerted by pressure of an operator's digits, i.e. fingers and thumbs. Varieties of known keyboard electronic circuits are used in conjunction with finger operated key members to complete electrical circuits each time a key member is depressed by the operator's digits. These circuits provide key signals to an associated computer to enable the computer to recognize which of the key members has been selected. The present invention will be described in conjunction with the use of conventional, known keyboard electronic circuits. However, the present invention may be used in conjunction with other electrical devices, besides computer keyboards, employing different electrical circuits.

Figure 2:
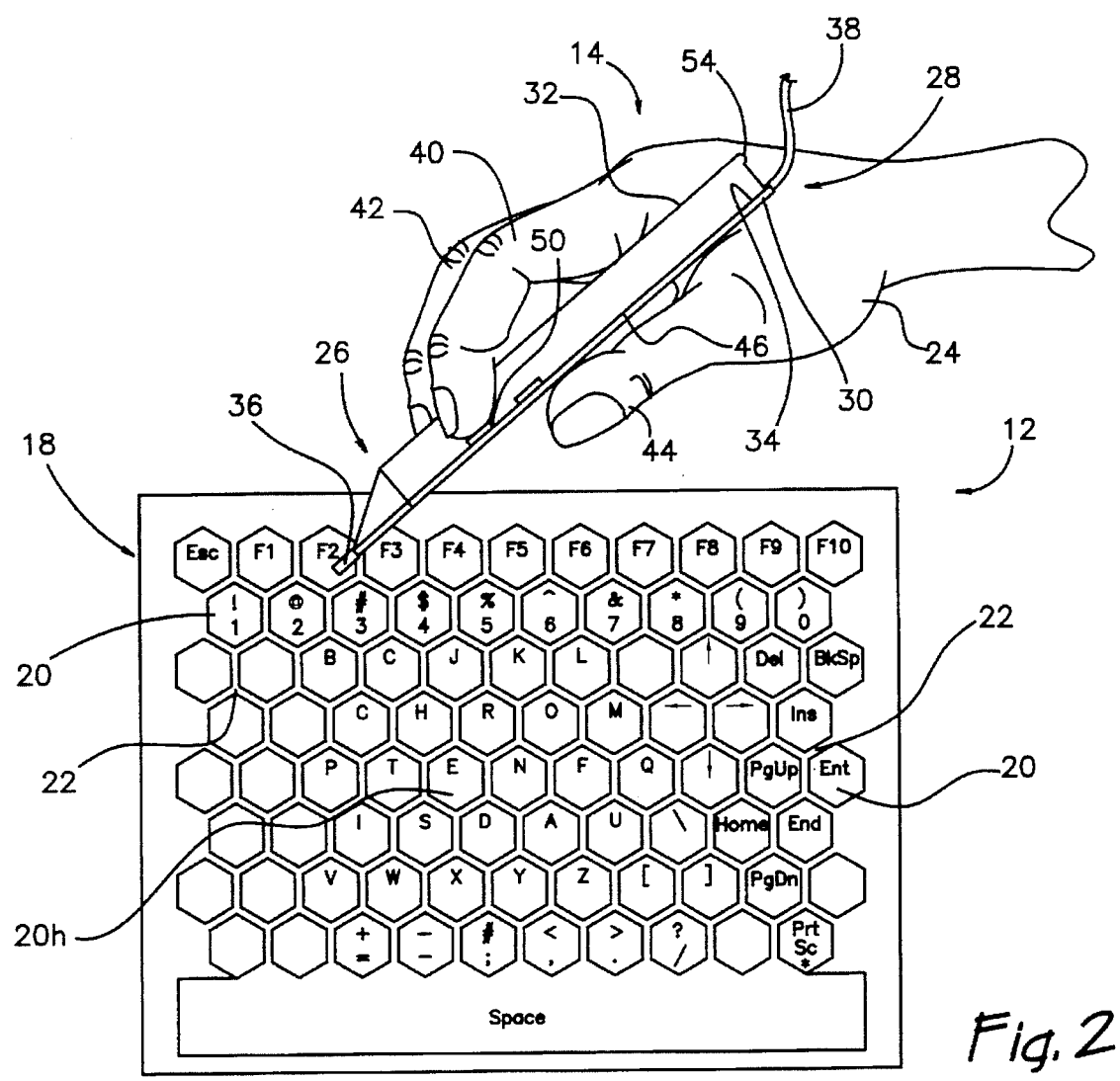
FIG. 2 is a plan view of the keyboard assembly with a hand-held stylus illustrating single handed operation.

FIG. 2 illustrates the construction of the keyboard 12 and the hand-held stylus member 14. The keyboard 12 includes a generally planar surface member 18 that may be flat and is formed from an electrically insulating material suitable for electronic applications. The generally planar surface member 18 includes a plurality of hexagonally shaped electrically conductive key members 20 each representing individual keyboard letters, numbers, and symbols. By way of example, the key members 20 are shown representing the letters and numbers and other symbols associated with the English language. However, other indicia or icons representing other languages may be employed.

The key members 20 are positioned adjacent to one another and are grouped in a honeycomb type pattern in order to minimize the distances between each of the individual key members 20. In order to improve the efficiency of the keyboard 12, the key members 20 representing the most frequently occurring pairs of letters of the alphabet for a particular language or application are positioned in close proximity to a center location represented by a key member 20h in FIGS. 2 and 3. This is a pattern in which some key members 20 are surrounded by other key members, and hence may be termed interior key members 20. At the outside or border of the pattern are border key members 20. Each interior key member 20 is adjacent to six other key members 20. Less used pairs of letters are arranged further from the center location, with their distances from the center location corresponding to the frequency of their use.

The pairs of letters that occur adjacent to one another are referred to as digraphs in U.S. Pat. No. 2,040,248 to Dvorak et al for a typewriter keyboard. The most compact grouping of the twenty-six letters of the English alphabet permits for fifty-nine so called digraphs on the keyboard. Placing the common most digraph TE at the center location and adding letters to make the next most common digraphs, leads to a number of efficient layouts, the best of which may be formed by elaborate computer trials. In the configuration shown, the size of the generally planar member 18 approximately coincides with the size of a hand, such as hand 24 shown gripping the hand-held stylus member 14. For example, this allows the hand-held stylus member 14 to be held one hand and the keyboard 12 to be held in the user's other hand. This also facilitates the use of the keyboard 12 in applications where physical space is limited.

An electrical insulating material 22 is disposed between each of the key members 20 to provide electrical isolation between adjacent key members 20. The key members 20 are configured such that each time one of the key members 20 is coupled to a predetermined voltage, an electrical circuit associated with that key member 20 is completed and the keyboard 20 transmits a key signal to the computer 16 for processing.

Figure 4:
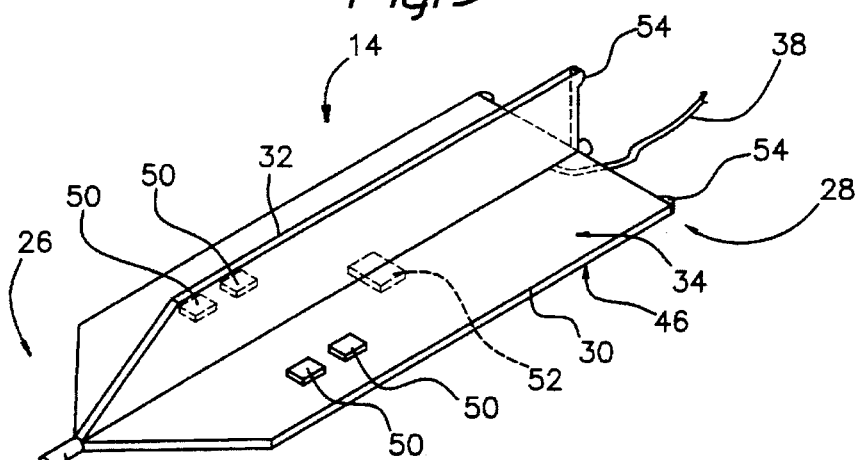
FIG. 4 is a perspective view of a hand-held stylus member.
Figures 5, 6:
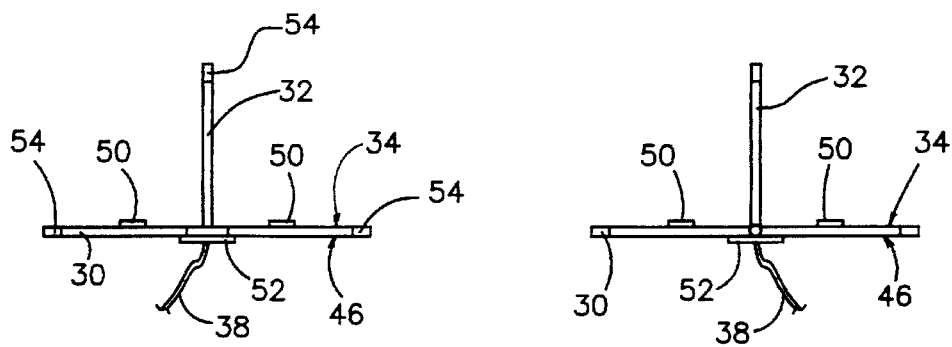
FIG. 5 is a an enlarged, rear end view of the hand-held stylus member.
FIG. 6 an enlarged, front end view of the hand-held stylus member.

The hand 24 is shown gripping the held stylus member 14 between a first, contact, end 26 and a second, remote, end 28. As best shown in FIGS. 4-6, the hand-held stylus member 14 has a cross section that is generally T-shaped for facilitating gripping by the digits, i.e. the fingers and thumb, of the hand 24. The hand-held stylus member 14 includes a head portion 30 that is gripped by three digit tips and a stem portion 32. The stem portion 32 extends upward from a first or front side 34 of the head portion 30. Additionally, in accordance with another alternative configuration, the second end 28 may have a thinner profile and be rounded for hand comfort, while the first end 26 is generally T-shaped for facilitating gripping by the digits.

An electrically conductive tip 36 forms the contact end 26 of the hand-held stylus member 14. A cord member 38, connected to the remote end 28, attaches to the keyboard 12 and a voltage source (not shown) which supplies a predetermined voltage, (for example, 5 volts) to the electrically conductive tip 36. The electrically conductive tip 36 is configured for individually contacting any of the key members 20, or can slide between adjacent key members 20 without being removed from the generally planar surface member 18. Alternatively, the hand-held stylus member 14 may be lifted and moved so that its tip 36 may be contacted against key members which are not adjacent. As a result, the electrically conductive tip 36 couples the predetermined voltage to any of the key members 20 that an operator contacts with the electrically conductive tip 36. The use of the electrically conductive tip 36 enables the physical size of the key members 20 to be minimized.

Returning to FIG. 2, the hand-held stylus member 14 is gripped by the hand 24 with an index finger 40 and a middle finger 42 contacting the first side 34 of the head portion 30 about the opposite sides of the stem portion 32. A user's thumb 44 is shown resting on the backside 46 of the stylus head portion 30. The hand-held stylus member 14 is held in a manner similar to that of a pencil-like writing instrument allowing an inexperienced operator to rapidly and efficiently maneuver the stylus member 14 upon the keyboard 12 without requiring extensive training or complex hand and finger movements.

As shown in FIGS. 4-6, manually depressible switches 50 are mounted upon the front side 34 of the head portion 30 of the hand-held stylus member 14 at the portions where each of the digits grasps the hand-held stylus device 14. By way of example, pairs of the depressible switches 50 are located on opposite sides of the stem portion 32 to facilitate operation by the user's fingers 40 and 42. In addition, a depressible switch 52 is located on the backside 46 of the head portion 30 for operation by the user's thumb 44. The switches 50 or the switch 52 may be depressed individually or concurrently while the hand-held stylus member 14 is maneuvered upon the keyboard 12. Each of the switches 50 and 52 activate suitable electrical circuits that provide modifying function signals through the cord 38 and ultimately to the computer 16. By way of example, these modifying functions may be the standard "shift", "control", and "alternate" functions that are found on a conventional keyboard. Additional depressible switches may be included on the hand-held stylus member 14 to modify or multiply the functions of the standard key members, or may be included for the most frequently used functions such as "enter", "space", and "backspace".

Also, the hand-held stylus member 14 can include a depressible switch for a "macro" function. Typically, macros are abbreviations that permit the typing of a sentence or a specific word with a few keystrokes by the operator. Languages like Chinese which have no alphabet require such groups of keystrokes to represent each word-symbol. According, the hand-held stylus member 14 can be swept across three or four of the key members 20 in less time than it would take to depress the same three or four key members. Indeed, such macros can form the basis of a shorthand stenography for English. If a user cannot remember the entire macro, the user can use the hand-held stylus member 14 to contact a first key member 20 representing a macro function in order to call up on the screen of the computer 16 hundreds of possibilities from which the user can then use the hand-held stylus member 14 to select the appropriate word. Software can be designed to divide a certain amount of the computer's screen into specific domains, each corresponding to one of the key members 20. When a given key member is touched, its domain on the screen may be highlighted; then by depressing a depressible switch on the hand-held stylus 14 an item in that domain may be selected.

In order to provide the operator of the stylus 14 with a visual indication that the switches 50 or the switch 52 are depressed, indicator lights 54 (see FIG. 5) may be mounted upon the hand-held stylus member 14. The indicator lights 54 are individually illuminated in response to one of the switches 50 or 52 being depressed. The indicator lights 54 may be color coded such that the operator may visually see which of the switches 50 and 52 are being depressed.

Figure 3:
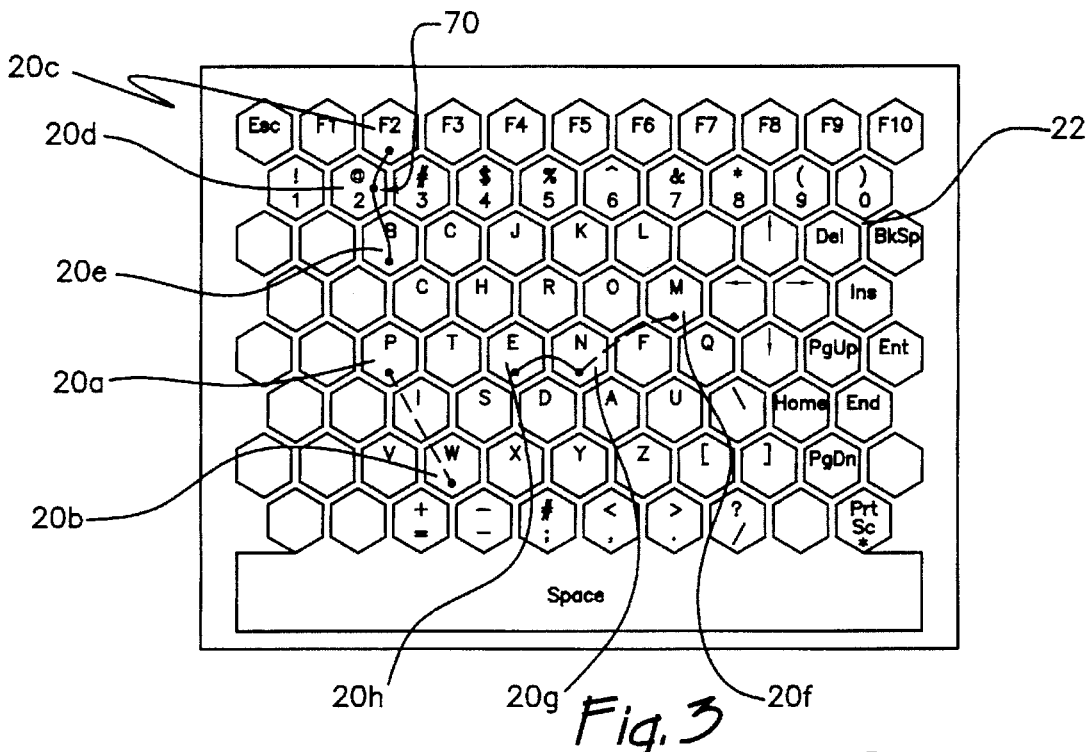
FIG. 3 is a plan view of keyboard with dotted and solid lines schematically showing various paths that the hand-held stylus member may traverse when inputting data into the computer.

FIG. 3 schematically illustrates examples of how an operator may use the hand-held stylus member 14 to rapidly input keyboard data into the computer 16 without requiring excessive hand and finger movements. An operator may grip the hand-held stylus member 14 as shown in FIG. 2 and bring the electrically conductive tip 36 into contact with any of the key members 20. For example, the electrically conductive tip 36 may be brought into contact with a key member 20a such that the predetermined voltage is coupled to the key member 20a. The hand-held stylus member 14 may then be manually lifted from the key member 20a and placed into contact with a key member 20b. This results in the computer being provided with sequential key signals from the key members 20a and 20b. In contrast, the hand-held stylus member 14 can be operated like a common writing instrument or "mouse" by placing the electrically conductive tip 36 in contact with a key member 20c and sliding the electrically conductive tip 36 along a path 70 across the insulating material 22 to a key member 20d and ending at a key member 20e. As will be apparent to one skilled in the art, such a simple movement allows an operator to swiftly input the keyboard data represented by key members 20c, 20d, and 20e with minimal hand and finger movements. Lastly, an operator may combine hand movements by placing the electrically conductive tip member 36 in contact with a key 20h, manually sliding the tip 36 across the insulating material 22 to a key member 20g, and manually lifting the electrically conductive tip 36 from the keyboard 12 and placing the electrically conductive tip 36 in contact with a key member 20f. Such a combination of hand movements allows the operator to swiftly input the keyboard data represented by key members 20h, 20g, and 20f.

The aforementioned uses and movements of the hand-held stylus member 14 are examples. Other uses and movements can be made by the operator. For example, when used conjunction with oriental languages, the keyboard 12 may be used to type the thousands of word-pictures of the Chinese and other oriental languages which typically require a code of three or four key strokes for each symbol. Starting from any key member 20, a user can slide the hand-held stylus member 14 to any of the six adjacent key members, then to any of the other six adjacent key members. Thus, sliding the hand-held stylus member 14 across three key members gives two hundred sixteen possibilities. Jumping over any three of the fifty key members gives one hundred and twenty-five thousand possibilities that a user may choose from.

The stylus and keyboard assembly 10 is easily used by operators who lack conventional typing skills. Moreover, compared to conventional finger operated keyboards, the stylus and such keyboard assembly 10 allows an unskilled operator to rapidly and efficiently enter keyboard data into a computer with simple hand and finger movements.

This invention may be further developed within the scope of the following claims. Therefore, the foregoing description should be read as being merely illustrative of an operative embodiment and not in a strictly limiting sense.

I now claim:

1. A compact stylus keyboard assembly coupled to a computer for reducing physical effort required to input keyboard data into the computer, comprising:

a computer; and a compact stylus keyboard assembly, further comprising
a generally planar surface member having a plurality of adjacently positioned, electrically conductive key members forming a keyboard with an upper, planar surface, and said key members each having a second upper planar surface located coplanar with the keyboard upper planar surface, each of said key members providing said computer with respective key signals when coupled to a predetermined voltage, said generally planar surface member having electrical insulating material disposed between each of said key members for providing electrical isolation therebetween, and means for enabling communication between said hand-held stylus member and said computer, and a hand-held stylus member having a first, contact end and a second, opposite end; said hand-held stylus member having an electrically conductive tip on said contact end and being coupled to said predetermined voltage, for individually contacting and thereby coupling said predetermined voltage to any one of said electrically conductive key members; and whereby said hand held stylus member is gripped by a single hand and said electrically conductive tip is selectively manually slidable from a first of said key members across said electrical insulating material to at least a second, adjacent said key member and is manually lifted from said first key member and placed in contact with another, non-adjacent said key member in order to provide said computer with respective key signals from said first and said second key members, and whereby physical effort required to operate said compact stylus keyboard assembly is minimized by said stylus member sliding between adjacent said key members, and wherein said electrically conductive key members are hexagonally shaped and grouped in a honeycomb pattern in order to minimize distances between said key members as well as distances that said hand-held stylus member must traverse in order to contact adjacent said key members.

2. A compact stylus keyboard assembly and computer of claim 1, and wherein said hand-held stylus member includes at least one depressible switch positioned in close proximity to the first end of said hand-held stylus member; and whereby said at least one depressible switch is depressed in response to an application of force by a finger in order to provide said computer with a modifying function signal.

3. A compact stylus keyboard assembly and computer of claim 1, and wherein said upper planar surfaces of said electrically conductive key members and said electrical insulating material are substantially coplanar, thereby facilitating sliding movements of said stylus member between adjacent said key members.

4. A compact stylus keyboard assembly of claim 1, and wherein said generally planar surface member has a center, and said key members are positioned in adjacent pairs such that frequently occurring pairs of letters of the alphabet are positioned adjacent one another and also in close proximity to said center of said generally planar surface member.

5. A compact stylus keyboard assembly of claim 1, said key members being arranged in a honeycomb pattern including interior key members and border key members, each said interior key member being adjacent to six other key members.

6. A compact stylus keyboard assembly of claim 1, said key members being hexagonally shaped.

7. A compact stylus keyboard assembly and computer of claim 1, and wherein said hand-held stylus member is generally T-shaped in cross-section along its length, and includes a head portion and a stem portion, said stem portion extending from a first side of said head portion.

8. A compact stylus keyboard assembly and computer of claim 7, and wherein said hand-held stylus member includes a first depressible switch and a second depressible switch mounted to said front side of said head portion on opposite sides of said stem portion; and whereby said first and said second depressible switches are depressed in response to applications of force by a first digit and a second digit in order to provide said computer with modifying function signals.

9. A compact stylus keyboard assembly and computer of claim 8, and wherein said head portion of said hand-held stylus member has a backside, and said hand-held stylus member further includes a third depressible switch mounted to said backside of said head portion; and whereby said third depressible switch is depressed in response to an application of force by a thumb in order to provide said computer with an additional signal providing a further additional modifying function signal.

10. A compact stylus keyboard assembly and computer of claim 8 further comprising:

at least one indicator light mounted in close proximity to said second end of said hand-held stylus member, and means for illuminating one of said at least one indicator light in response to one of said depressible switches being depressed such that a visual indication is provided indicating that said one of said depressible switches is depressed.

11. A compact stylus keyboard assembly for use with computer for reducing physical effort required to input keyboard data into the computer, comprising:

a generally planar surface member having a plurality of adjacently positioned, electrically conductive key members forming a keyboard with an upper, planar surface, and said key members each having a second upper planar surface located coplanar with the keyboard upper planar surface, each of said key members providing the computer with respective key signals when coupled to a predetermined voltage, said generally planar surface member having electrical insulating material disposed between each of said key members for providing electrical isolation therebetween;

a hand-held stylus member having a first, contact end and a second, opposite end;

said hand-held stylus member having an electrically conductive tip on said contact end and being coupled to said predetermined voltage, for individually contacting and thereby coupling said predetermined voltage to any one of said electrically conductive key members; and whereby said hand held stylus member is gripped by a single hand and said electrically conductive tip is selectively manually slidable from a first of said key members across said electrical insulating material to at least a second, adjacent said key member and is manually lifted from said first key member and placed in contact with another, non-adjacent said key member in order to provide the computer with respective key signals from said first and said second key members, and whereby physical effort required to operate said compact stylus keyboard assembly is minimized by said stylus member sliding between adjacent key members, and wherein said electrically conductive key members are grouped in a honeycomb pattern including interior key members and border key members, each said interior key member being contiguously adjacent to six other said key members so that a common border is shared, in order to minimize distances between said key members as well as distances that said hand-held stylus member must traverse in order to contact adjacent said key members.

12. A compact stylus keyboard assembly of claim 11, and wherein said hand-held stylus member includes at least one depressible switch positioned in close proximity to the first end of said hand-held stylus member; and whereby said at least one depressible switch is depressed in response to an application of force by a finger in order to provide said computer with a modifying function signal.

13. A compact stylus keyboard assembly of claim 11 further comprising:

at least one indicator light mounted in close proximity to said second end of said hand-held stylus member, and means for illuminating one of said at least one indicator light in response to one of said depressible switches being depressed such that a visual indication is provided indicating that said one of said depressible switches is depressed.

14. A compact stylus keyboard assembly of claim 11, and wherein said upper planar surfaces of said electrically conductive key members and said electrical insulating material are substantially coplanar, thereby facilitating sliding movements of said stylus member between adjacent said key members.

15. A compact stylus keyboard assembly of claim 11, and wherein said generally planar surface member has a center, and said key members are positioned in adjacent pairs such that frequently occurring pairs of letters of the alphabet are positioned adjacent one another and also in close proximity to said center of said generally planar surface member.

16. A compact stylus keyboard assembly of claim 11, and wherein said hand-held stylus member is generally T-shaped in cross-section along its length, and includes a head portion and a stem portion, said stem portion extending from a first side of said head portion.

17. A compact stylus keyboard assembly of claim 16, and wherein said hand-held stylus member includes a first depressible switch and a second depressible switch mounted to said front side of said head portion on opposite sides of said stem portion; and whereby said first and said second depressible switches are depressed in response to application of force by a first digit and a second digit in order to provide the computer with modifying function signals.

18. A compact stylus keyboard assembly of claim 17, and wherein said hand-held stylus member further includes a third depressible switch mounted to a back side of said head portion; and whereby said third depressible switch is depressed in response to an application of force by a thumb in order to provide the computer with an additional signal indicative of an additional modifying function signal.

* * * * *